Oct. 25, 1966  D. B. SABIN  3,281,844
POSITION INDICATING APPARATUS
Filed Dec. 16, 1963  6 Sheets-Sheet 1

INVENTOR.
DARREL B. SABIN
BY Myron E. Click
atty

Oct. 25, 1966 D. B. SABIN 3,281,844
POSITION INDICATING APPARATUS
Filed Dec. 16, 1963 6 Sheets-Sheet 2

INVENTOR.
DARREL B. SABIN
BY Myron E. Click
att'y

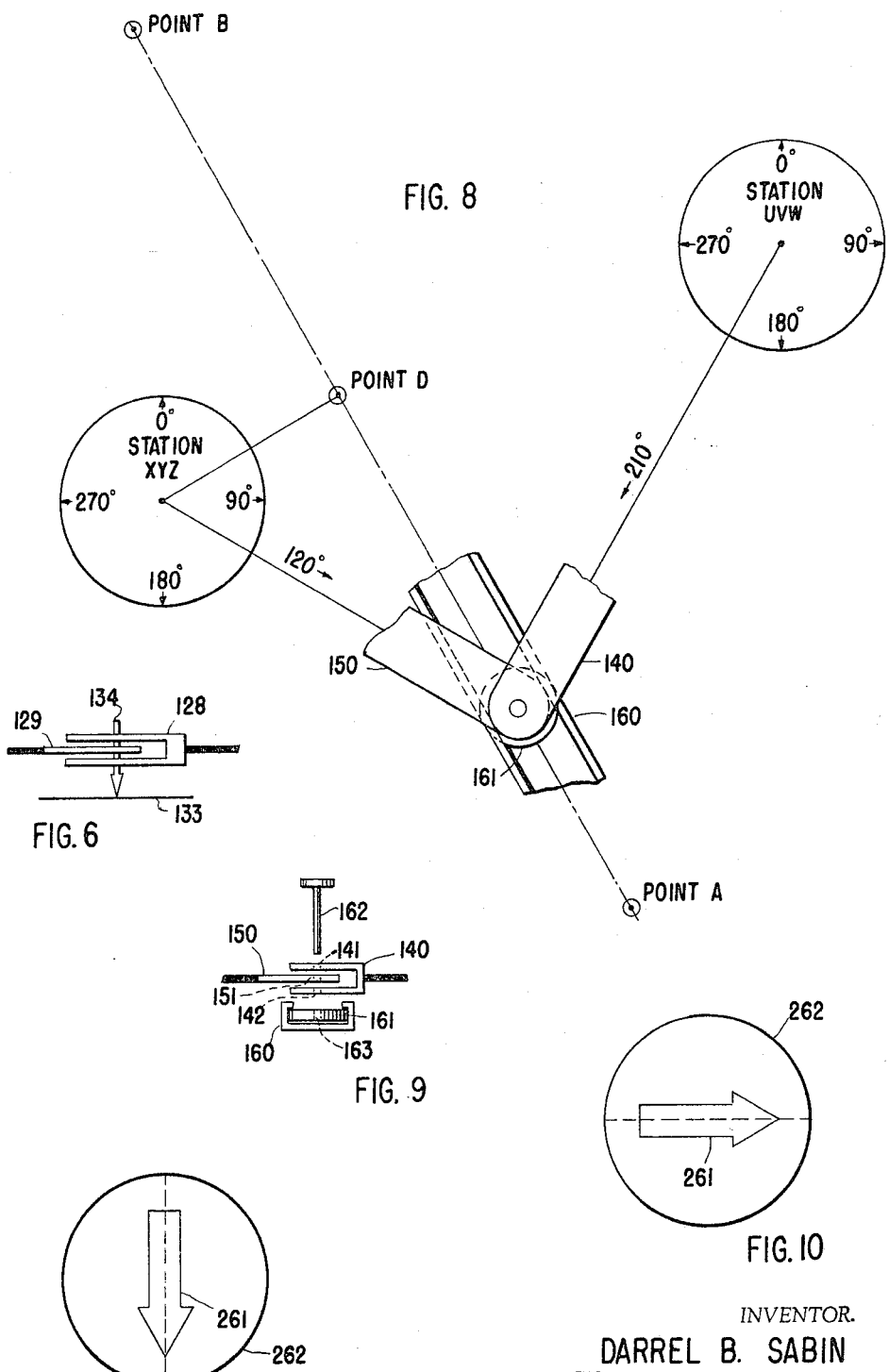

INVENTOR.
DARREL B. SABIN
BY Myron E. Glick
Atty

Oct. 25, 1966 D. B. SABIN 3,281,844
POSITION INDICATING APPARATUS
Filed Dec. 16, 1963 6 Sheets-Sheet 5

INVENTOR.
DARREL B. SABIN
BY Myron E. Click
Atty.

INVENTOR.
DARREL B. SABIN

United States Patent Office 3,281,844
Patented Oct. 25, 1966

3,281,844
POSITION INDICATING APPARATUS
Darrel B. Sabin, Toledo, Ohio
(703 Scherm Road, Apt. 11a, Owensboro, Ky.)
Filed Dec. 16, 1963, Ser. No. 330,910
27 Claims. (Cl. 343—112)

This invention relates generally to position indicators and in particular to a system for providing a continuous visual display of the position of an aircraft to a pilot or crew member, relative to certain radio navigation aids on the ground and relative to land marks as shown on the navigation charts.

In the United States today the most widely used air navigation system is the Very High Frequency Omni Range (VOR) system used by the airlines and by general aviation. In aircraft equipped with receiving apparatus for navigating by VOR ground stations the pilot is provided: (1) a means for tuning the receiver to the desired station; (2) a means for selecting a radial of the station; (3) a "left-right" meter showing whether the aircraft is flying to the right or to the left or on the selected radial; and (4) a "to-from" indicator showing whether the aircraft is flying on the selected radial or on the reciprocal of the selected radial.

The navigation portion of the VOR station transmits two signals, a reference phase signal and a variable phase signal. The variable phase signal is produced by rotating effectively a limacon antenna pattern 30 times per second at the station. The reference phase signal is at the present 9960 cycles subcarrier frequency-modulated between 9480 and 10440 cycles with a fixed phase 30 cycle modulation.

The variable phase signal is thus a 30 cycle sine wave modulation whose phase angle relative to the 30 cycle F.M. on the 9960 cycle subcarrier depends upon the bearing of the aircraft's receiving antenna to the station. The station is adjusted so that the variable phase signal is "in phase" with the reference phase at a bearing due magnetic North (zero degrees magnetic) from the station. At magnetic South of the station the signals are 180° out of phase. The VOR receiver in the aircraft indicates, by means of a course selector indicator, the relative phase angle between the variable phase signal and the reference phase signal, as received, thus indicating the radial on which the aircraft is located. Unlike radio direction finding equipment, the VOR receiver indicates azimuth position rather than the direction of the station. Therefore, the VOR azimuth indication is independent of the aircraft heading.

Since the advent of the VOR system a network of airways has been established in the United States, using the VOR stations as intermediate and terminal points, in which system the aircraft is flown on a radial of a VOR station. The VOR airways are used by flights flying visual flying rules (VFR) and instrument flying rules (IFR). Pilots flying IFR are required to identify certain intersections along their route. An intersection is defined as the point where a specified radial of a specified adjacent VOR station crosses the radial which makes up the airway being traveled. By tuning a second VOR receiver to the adjacent VOR station and by turning the radial selector of the second VOR receiver to the required specified intersecting radial, the intersection is identified by the centering of the "left-right" needle of the second VOR receiver. As long as the pilot maintains a course on the radial of a ground station (as is the case when flying airways) the pilot, by plotting crossfixes from another station, can determine his position.

It is highly desirable, however, that a method be devised to utilize courses other than those requiring the pilot to remain on one radial of a VOR station. Such an "off-radial" course system would provide a widely expanded system of federal airways since airways would no longer have to pass directly over ground stations. Further, an "off-radial" system would provide a method for flying from one point directly to another without having to fly first over one or more VOR stations. This of course would substantially reduce traffic concentrations over VOR stations and would speed up cross-country travel by allowing more direct routes to be plotted.

Accordingly, it is an object of this invention to provide an improved navigation system.

It is a further object of this invention to provide an improved navigation system which may utilize existing aircraft VOR receivers now installed in aircraft.

A further object of this invention is to provide a system as described above which takes up little space in the restricted areas presently available in aircraft cockpits.

A still further object of this invention is to provide a system adaptable to the commonly used air navigation charts of any scale.

Another object of this invention is to provide a system according to the discussion above which is light in weight and which preferably may be utilized over standard aircraft navigation charts.

Other objects, advantages and features of this invention will become apparent when the following description is taken in conjunction with the accompanying drawings, in which:

FIG. 6 is a side elevational view of marking pen apparatus embodying the teachings of this invention;

FIG. 8 is a plan view of apparatus embodying the teachings of this invention;

FIG. 9 is a front elevational view of the apparatus in FIG. 8;

FIG. 10 is a plan view of a pin embodying the features of this invention;

FIG. 13 is a plan view of the pin shown in FIG. 10 in a different position.

Figure 1:
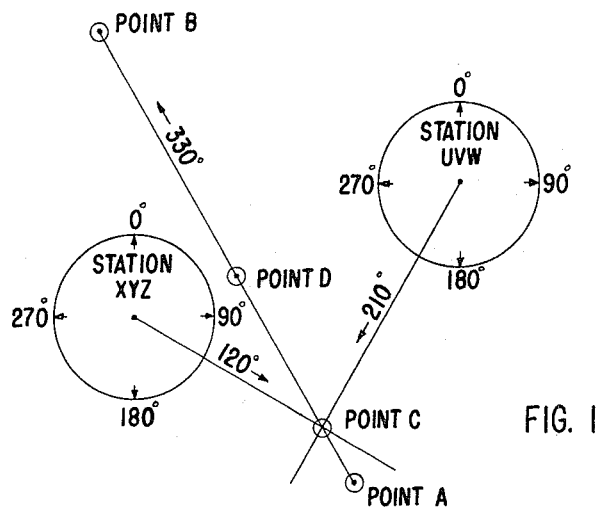
FIG. 1 is a diagram representing aircraft chart navigation.
Figure 2:
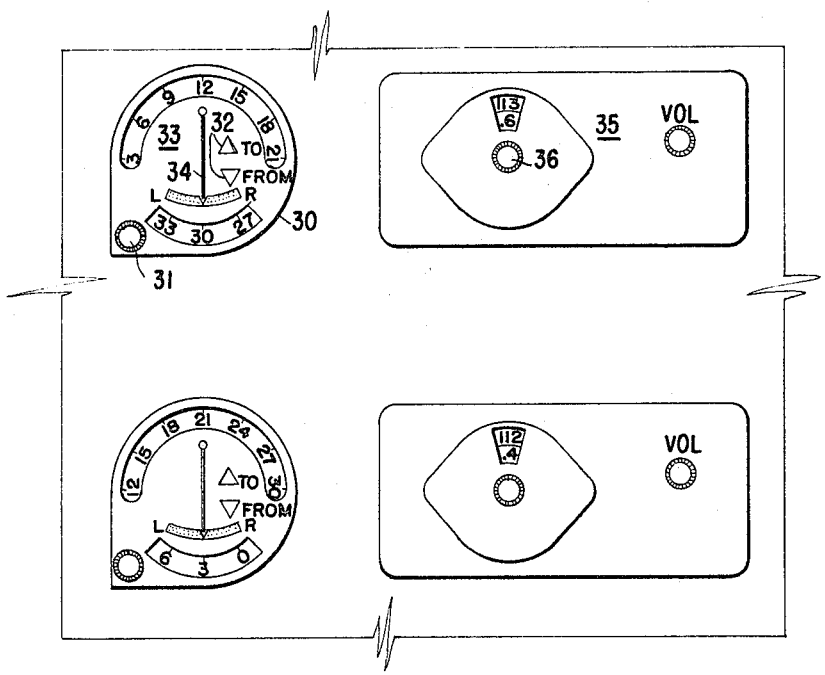
FIG. 2 is an illustration of a typical dual VOR receiver installation on a cockpit panel.

Referring to FIGS. 1 and 2, let us assume that a pilot in his aircraft is at point C in the illustrative diagram of FIG. 1. If the pilot wished to determine his position he would first set the frequency selector of the receiver 35 to the transmitting frequency of station XYZ by turning knob 36. Then he would rotate the course selector dial of the indicator-course selector 30 in FIG. 2 by means of knob 31 until the "left-right" needle 34 of the "left-right" meter indicated generally at 33 centered, and the "to-from" indicator 32 read "from." The indicator-course selector 30 would indicate that the pilot was on the 120° radial of station XYZ. By pursuing a similar procedure on the lower VOR unit the pilot could determine that he was on the 210° radial of station UVW and, by plotting the radials on a suitable chart, could determine that he was at point C.

If the pilot wished to fly the 330° course indicated between points A and B in FIG. 1 he could accomplish this by setting the course selectors of the dual VOR receivers manually, by plotting his position at frequent intervals, and by correcting the heading of his aircraft so that the course between points A and B could be maintained. In actual practice, however, this procedure is too laborious to be useful.

Figure 3:
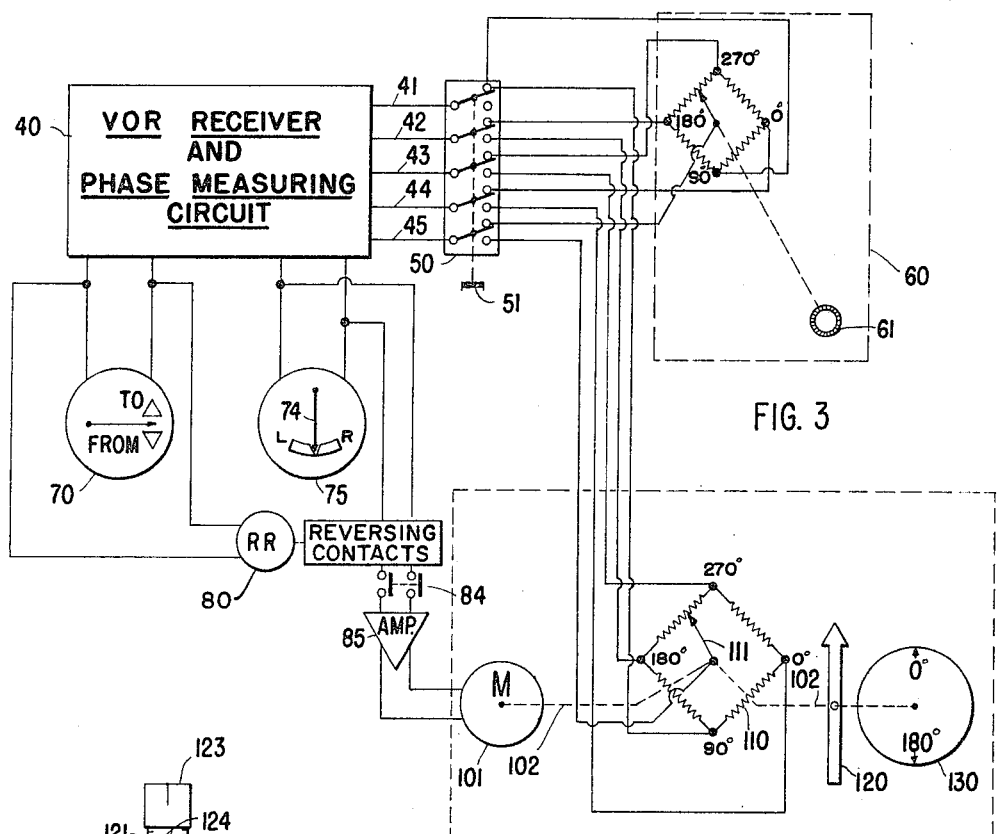
FIG. 3 is a schematic circuit diagram embodying the teachings of this invention.

Referring to FIG. 3 there is shown a schematic circuit diagram embodying the teachings of this invention. A VOR receiver and phase measuring circuit 40 has a "to-from" meter 70 and a "left-right" meter 75 connected thereto. Output leads 41 through 45 from the VOR receiver 40 are connected to a potentiometer 60 through the gang switch 50 which may be actuated by a button 51. The potentiometer 60 may be a portion of the standard VOR receiver equipment and be panel mounted as a part of the radial selector of the indicator-course selector as shown in FIG. 2. A portable radial selector or potentiometer 110 with electrical characteristics substantially identical to the panel mounted radial selector 60 is connected to a motor-reducer unit 101 so that the slider 111 of the potentiometer 110 is driven by the output shaft of the motor-reducer unit 101. Both potentiometer 110 and potentiometer 60 are connected through the double throw gang switch 50 to the VOR receiver converter unit 40. A phase-sensitive servo amplifier 85 is connected so that its input signal is derived from the signal sent to the "left-right" meter 75 from the VOR receiver and phase measuring circuit 40. When the panel mounted potentiometer 60 is connected through gang switch 50 to the receiver 40, and the phase relationship set by the panel mounted potentiometer 60 is the same as the phase relationship from the VOR station, then the "left-right" meter 75 receives no current and its needle is centered. Similarly, when the portable potentiometer 110 is connected through the gang switch 50 to the VOR receiver 40, if the phase relationship of the potentiometer 110 is the same as the phase relationship from the receiver 40, then the "left-right" meter 75 again receives no current and the needle is centered. If the phase relationships set by the connected potentiometer, either 60 or 110, do not match, then the "left-right" meter 75 receives current approximately proportional to the displacement of the two phase relationships. The direction of the "left-right" needle 74 movement is indicative of the direction of displacement.

In operation, the double throw switch 50 is first set so that the potentiometer 60 is in the circuit. The VOR receiver 40 is tuned to the desired VOR ground station and the radial selector potentiometer 60 is turned so that the "to-from" meter 70 shows "from" and so that the "left-right" needle 74 is approximately centered. The slider or pointer 111 of potentiometer 110 is then turned manually to about the same setting as potentiometer 60. A signal gate 84 between the amplifier 85 and the phase measuring circuit 40 is closed and double throw switch 50 is set so that the potentiometer 110 is in the circuit. If the "left-right" needle 74 is deflected (i.e., if the meter 75 is receiving current) the amplifier 85 will transmit a signal to the motor-reducer unit 101 and the output shaft of the motor-reducer unit 101 will turn either clockwise or counterclockwise, depending upon the phase of the input signal to the amplifier 85. As the output shaft turns, the slider 111 of the potentiometer 110 is also turned. When the slider 111 of the potentiometer 110 reaches a position where the phase of the potentiometer 110 matches the phase from the ground station, as sensed in the converter unit 40, the "left-right" meter needle 74 is centered, the amplifier 85 receives no signal from the phase measuring circuit, and the motor-reducer unit 101 stops.

Figure 5:
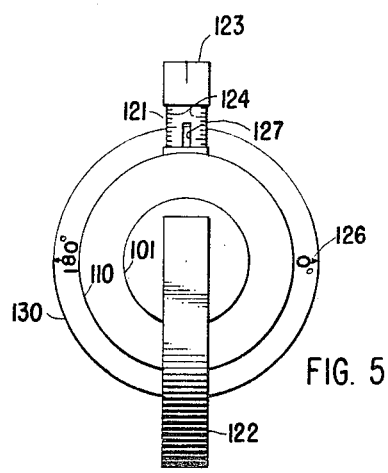
FIG. 5 is a plan view of the apparatus illustrated in FIG. 4.
Figure 4:
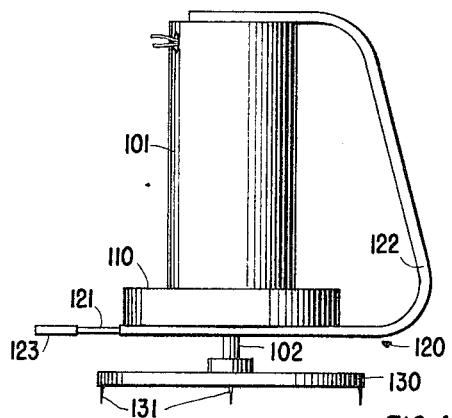
FIG. 4 is a side elevational view of apparatus embodying the teachings of this invention.

Referring to FIGS. 4 and 5, there is shown an embodiment of a combined motor-reducer-potentiometer unit which may be utilized in this invention. In FIG. 4 the motor-reducer is shown as an integral unit 101. The output shaft 102 of the reducer is positioned at the center of the unit. This type of unit is well known in the industry. The potentiometer 110 is housed below the motor-reducer unit 101 and its slider 111 is driven by the output shaft 102 (as shown in FIG. 3) so that the slider 111 turns with the shaft 102. The output shaft 102 extends past the potentiometer and is fastened to the center of a preferably transparent disc 130. The disc may be marked off in degrees of the compass rose (as indicated at 126). The entire unit is designed to rest on and rotate above the disc 130. An indicator assembly 120 is attached to the motor-reducer-potentiometer unit in such a manner that a pointer means is free to be extended to a desired length. The pointer means is preferably made of a material that is rigid under normal conditions but that will yield if subjected to a strong bending force and will return to its normal shape when the bending force is removed. Such material may be that utilized in the steel ribbon tapes used commercially for flexible rulers. As shown in FIGS. 4 and 5 the indicator assembly 120 comprises a tape 121 which slides in and out of the housing 122. The pointer end 123 may be made of a transparent material on which the center line of the pointer is scribed. The pointer may have indicia 124 inscribed in miles in common scales so that distance from the aircraft to the station can be seen. In this embodiment the tape 121 may have a longitudinally extending slot 121 formed therein to accommodate shaft 102 so that the tape may still be centered with respect to the axis of the unit yet be extended and retraced in housing 122. An arrangement having the housing "off center," but the pointer end "on center," that is, on a radial as it is extended and retracted, may also be used.

If the motor-reducer-potentiometer unit is placed on a suitable air navigation chart so that the unit is centered over or on a VOR ground station, as shown in FIG. 1, and if the North of the potentiometer 110, as indicated by the zero degree mark inscribed at 126 in FIG. 5, is aligned with the North of the VOR ground station, then the pointer 123 will indicate on which radial of the VOR station that the aircraft is flying as described hereinbefore.

If the aircraft does not remain on one radial, the phase measuring circuit 40 detects the change. The amplifier 85 then signals the motor-reducer unit 101 to rotate in the proper direction until the slider 111 of potentiometer 110 reaches a position where the phase of the potentiometer 110 again matches the phase of the ground station. In actual practice the amplifier 85 detects only a slight deviation in the "left-right" phase relationship and immediately causes the motor-reducer-potentiometer unit to rotate. The extended pointer means 120 on the motor-reducer-potentiometer unit, then, continuously indicates the radial on which the aircraft is flying.

If another motor-reducer-potentiometer and amplifier system identical to the first is connected to a second VOR receiver in the aircraft, and if the second VOR receiver is tuned to receive another nearby VOR station, and if the second motor-reducer-potentiometer unit is placed on the same navigation chart, aligned over the second VOR station in a manner similar to the first motor-reducer potentiometer unit, then the point at which the radial pointers of the two units cross will be the location of the aircraft.

To assist in maintaining the units in position on a chart tack means 131 may be depended from the bottom of disc 130 to pierce the chart and engage a composition board supporting the chart. Other suitable means such as suction cup means may also be utilized, or magnets cooperating with a steel underplate.

Referring to FIG. 6 a continuous record of the travel of the aircraft may be obtained by joining the ends of two modified pointers 128, 129 with a swivel marking pen 134 which forms a hinge pintle for the pointers 128, 129. The pen 134 will then mark the point of the intersection of the two pointers and, since the pointers are free to move toward or away from their respective motor-reducer-potentiometer units, the pen 134 not only indicates the instantaneous position of the aircraft but also draws a line on the navigation chart 133 showing the ground path of the aircraft.

Other indicating or marking means may be utilized other than the mechanical means illustrated herein. For example, an optical system which is available in the industry may be used in place of the pointers. The optical system projects a narrow beam of light. The intersection of the beams of light of course would then indicate the position of the aircraft. It should be noted that the housing 122 for the pointer system 120 of the units shown in FIGS. 4 and 5 also serves as a handle means for the unit with which the unit may be moved or supported for storage.

It may be desirable to be able to operate the position indicating system by using a "to" signal that is received by the "to-from" meter as well as the previously described "from" signal.

Figure 7:
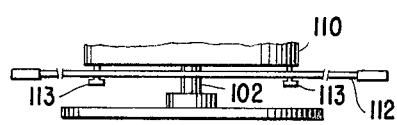
FIG. 7 is a side elevational view of another embodiment of pointer means.

Referring again to FIG. 3 it will be noted that a reversing relay 80 receives a signal from the "to-from" circuit. A "to" signal energizes the reversing relay 80 and a "from" signal deenergizes the reversing relay 80, or vice versa. Either the output signal from the phase sensitive amplifier 85 to the motor-reducer unit 101 or the output from the "left-right" meter 75 may be directed through the contacts of the reversing relay 80 shown in FIGURE 3 in block diagram form in the circuit between the meter 75 and the signal gate 84. With a "from" signal the pointer mechanism 120 on the motor-reducer-potentiometer unit 100 may be, for example, turned clockwise when the "left-right" needle 74 tends to move left and the pointer may be turned counterclockwise when the "left-right" needle tends to move right. With a "to" signal the pointer mechanism 120 on the unit 100 may be turned counterclockwise when the "left-right" needle tends to move left and the pointer mechanism 120 may be turned clockwise when the needle tends to move right. Use of a "to" signal as well as a "from" signal will require the employment of a double ended pointer means 112 shown in FIG. 7 which may be supported below the potentionmeter 110 housing on hangers 113 which carry pointer 112 by slot means as described hereinbefore or other suitable means. In FIG. 7 the pointer 112 may be extended along opposite radials as desired. One might also rotate the disc 130 around 180° to obtain the same results.

The most widely used radio navigation system by military aircraft in the United States is the Tactical Air Navigation (TACAN) System. The TACAN System uses a pulse system operating in the ultra-high frequency band for determining azimuth of the aircraft relative to a TACAN station. However, TACAN navigation receivers have a radial selector potentiometer, a "left-right" meter, and a "to-from" meter, in common with the VOR type of receiver and thus may be utilized in the manner shown in the schematic diagram of FIG. 3.

It is believed unnecessary to repeat schematically how TACAN receivers may be connected to utilize the principles shown in FIG. 3.

It is to be noted that while phase-sensitive components have been referred to hereinbefore that comparable direct-current polarity-sensitive units may be utilized with the same results. That is, it is intended to include within the scope of this invention any suitable equipment to provide a desired rotation of a pointer means centered above or on a ground station shown on a chart in response to a signal indicating that the aircraft is to the left or right of a radial of that ground station.

This invention also provides means whereby the "left-right" meter of one VOR or TACAN receiver may be utilized to guide the pilot flying an "off-radial" course as is done now to fly on one radial of a VOR or TACAN station. This portion of the system is especially useful in aircraft equipped with automatic pilots capable of guiding the aircraft from a VOR or TACAN signal.

Referring to FIGS. 8, 9 and 1, assume that a pilot intends to fly an aircraft on a straight line course from point A to point B in FIGS. 1 and 8. It may be seen that at point C, if the aircraft is on course, it must be on the 120° radial of station XYZ and on the 210° radial of the station UVW. A motor-reducer-potentiometer unit such as previously described is placed over and aligned with station UVW. A unit utilizing only a potentiometer, transparent disc, and pointer 150 similar to that previously described is centered over or on station XYZ, with the North reference point (i.e. zero or 360 degree mark) of the potentiometer aligned with the North of station XYZ. The pointer 140 of the motor-reducer-potentiometer unit aligned over station UVW and the pointer 150 of the potentiometer unit aligned over station XYZ are joined at their ends by and are free to pivot about a pin 162 journaled in apertures 141, 142 and 151, respectively. The pin 162 fits into an aperture 163 of a block 161 which is free to slide in the transparent track 160. The transparent track 160 is affixed on the navigation chart over the desired course between points A and B. The motor-reducer-potentiometer unit aligned over station UVW is energized as previously described and its pointer 140 moves the block 161 along the track 160 and pointer 150 is moved in proper relationship to pointer 140 for the desired course. Thus, as the aircraft moves, pointer 140 not only continuously indicates on which radical of the station UVW the aircraft is flying but also moves pointer 150 to indicate on which radial of station XYZ the aircraft should be flying. A difference between the required radial of station XYZ and the actual radial on which the aircraft is flying is shown on the "left-right" meter of the VOR receiver tuned to station XYZ.

It should be noted that units utilizing potentiometers only similar to that just described for use on station XYZ with corresponding radial pointer means may be used to manually obtain readings from the two "left-right" meters which will indicate if the pilot is on his chosen course. Each unit is connected to the panel mounted circuits as hereinbefore described. The intersection of the joined pointer means is moved manually along the chosen course as the aircraft moves. The "left-right" meters will then indicate if the aircraft is to the left or right of the respective radial noted by the respective pointer means.

VOR and TACAN systems are set up so that the pilot turns his aircraft "toward the needle" to remain on course.

A "left-right" needle moving to the right of center indicates that the selected radial is to the right of the aircraft and the pilot makes the correction in his heading accordingly. The reverse is true for a left movement of the "left-right" needle. However, if the pilot should turn his aircraft so that his ground course were 90° or more displaced from the heading of the selected radial the pilot could no longer fly "toward the needle" and intercept the selected radial. For example, if a pilot chooses to fly from a station on the 180° radial of the station and sets his radial selector on 180° his "left-right" needle will indicate left if he should be in a position Southwest of the station, even if he is headed North. Obviously, if he turned left from a North heading he would move farther from his course rather than closer to it. If the pilot maintains any heading between 091° and 269° with respect to the heading of his selected radial (with zero wind) however, the left-right indications of his "left-right" meter will be valid.

It can be seen that an aircraft at position C in FIG. 1 when flying course A–B will be heading more than 90° from the heading of the 120° radial of station XYZ. If the "to-from" indicator of the receiver tuned to station XYZ is showing "from," in order to maintain the course A–B anywhere between points A and D the aircraft would have to be turned "away from the needle." That is, point D is the point along the course A–B where the aircraft's heading forms a 90° angle with a radial of station XYZ. From point D to point B the aircraft would be turned "toward the needle" in order to maintain the course A–B.

To correct for the reversal of the "left-right" meter indication as the aircraft moves from section A–D of the course to section D–B the pilot can, by noting his position relative to station XYZ, make his heading corrections "away from" or "toward the needle." Most automatic pilots with VOR or TACAN coupling can be switched to turn the aircraft either toward or away from the needle.

When flying the A–D section at course A–B, the pilot may also reverse the potentiometer unit located at station XYZ 180°. This would give a "to" indication on the XYZ course selector and the pilot could turn his aircraft toward the needle to stay on course A–B. At point D the pilot would rotate the unit 180° again and continue to fly toward the needle in the D–B section of his course.

Figure 11:
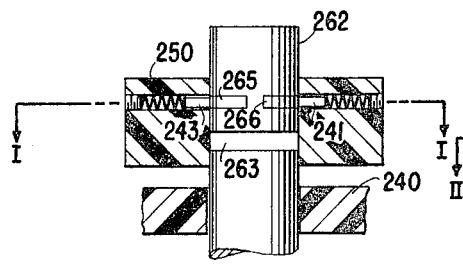
FIG. 11 is a cross sectional view taken from the side of a pointer means embodying the teachings of this invention.
Figure 14:
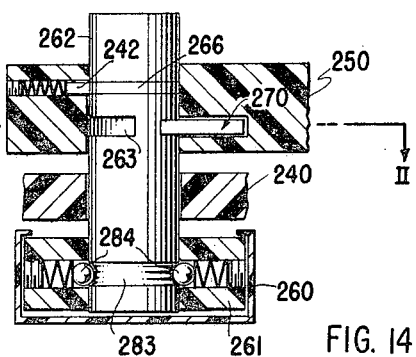
FIG. 14 is a cross sectional view of the apparatus of FIG. 11 taken from the side.
Figure 12:
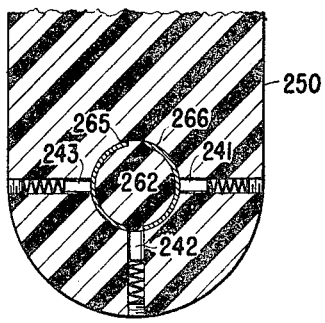
FIG. 12 is a cross sectional plan view of the apparatus in FIG. 11 taken at lines I—I.
Figure 15:
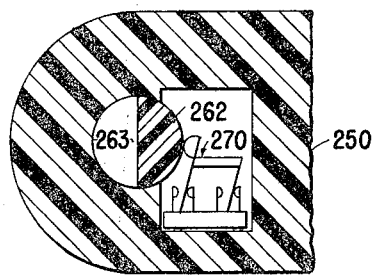
FIG. 15 is a cross sectional plan view of the apparatus shown in FIG. 14 taken at lines II—II.

A system for correcting the "left-right" indication automatically so that the aircraft is always turned "toward the needle" in order to maintain course is shown in FIGS. 10 through 18. The system is a modification of the apparatus shown in FIGS. 8 and 9. A pivot pin 262 (shown in plan in FIGS. 10 and 13) has a two segment conductor 265 and 266 embedded around its circumference as best seen in FIGS. 11 and 12. Spring biased brushes 241, 242 and 243 are positioned inside the pointer head 250 of the potentiometer unit to be aligned over station XYZ. One-half of the pin 262 is cut away at slot 263 just below the conducting strips 265 and 266 as best seen in FIGS. 11 and 14. A microswitch 270 embedded in the pointer 250 is positioned to be actuated and deactuated according to the rotary relationship between the pin 262 and the pointer arm 250.

The upper end of the pin 262 is scribed with an arrow 261 as best seen in FIGS. 10 and 13. The arrow 261 is aligned with the heading of the aircraft relative to the navigation chart. Thus, pin 262 is turned so that the arrow points in the direction that the aircraft is heading, relative to the track 260 (see FIG. 14) similar to track 160 shown in FIG. 8.

Figure 16:
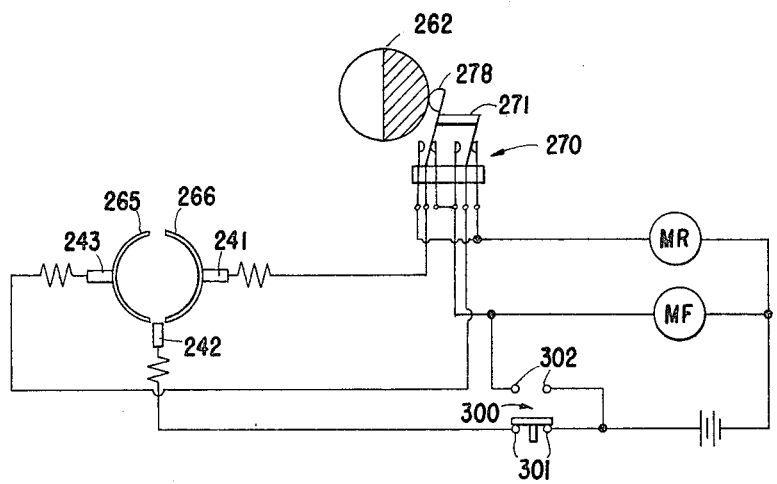
FIG. 16 is a schematic circuit diagram illustrating the connections of the apparatus shown in FIGS. 10 through 15.
Figure 17:
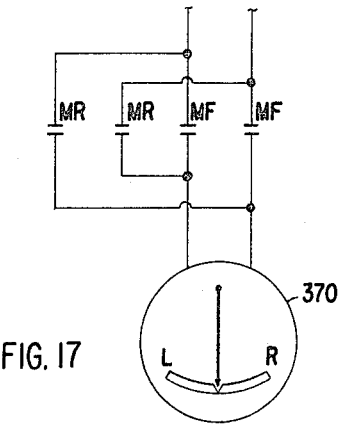
FIG. 17 is a schematic diagram showing an application of the output of the circuit of FIG. 16.

Referring to FIGS. 8 and 10 through 18 it may be seen that when the aircraft is at point A brushes 242 and 243 are in contact with segment 265. At this point the armature 271 of the microswitch 270 is depressed by the action of the cam follower 273 against the side of pin 262, since the pin arrow 261 is pointed in the direction of the aircraft heading. Therefore, relay MR in FIG. 16 is energized and the signals to the "left-right" meter 370 in FIG. 17 are reversed through closed contacts MR. To remain on course, the pilot then turns his aircraft "toward the needle" following the usual system.

Referring to FIG. 14 there is illustrated a means for maintaining pin 262 at a desired setting. A rectangular block 261 is positioned to slide in a transparent track 260 similar to that described previously with respect to FIGS. 8 and 9. Pin 262 may have a circumferential channel 283 formed therein to receive spring biased restraining means 284 (shown herein as a ball bearing). The spring bias is sufficiently strong to hold pin 262 in a selected position against the turning force exerted by pointer ends 240 and 250, yet is weak enough to permit manual resetting to another selected position.

Figure 18:
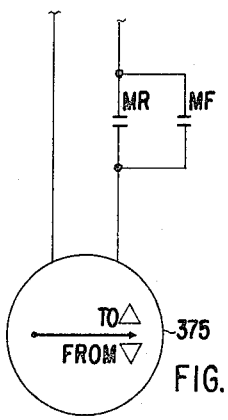
FIG. 18 is a further schematic diagram showing a utilization of the output of the apparatus of FIG. 16.

If the ground track of the aircraft is to be 330° magnetic and the heading of the aircraft required to maintain the track is 335° magnetic because of the wind, then the pin 262 is rotated 5° to the right of the track. When the aircraft reaches a position along a track where the heading of the aircraft itself is perpendicular to a radial of station XYZ, then the brush 242 reaches a nonconducting portion of the pin 262, relays MR and MF in FIG. 16 are both deenergized, and no current flows to the "left-right" meter 370 in FIG. 17 or to the "to-from" meter 375 as noted in FIG. 18. The "to-from" meter 375 then reads "off." As the aircraft continues along the track 260, brush 242 comes in contact with conductor segment 266 and current flows through brush 241 to relay MF. The relay MF is energized and closes contacts in FIG. 17 to deliver current to the "left-right" 370 meter in its normal polarity, so that the pilot can continue to fly "toward the needle." Energization of either the MF or MR relays allows current to flow to the "to-from" meter 375 as shown in FIG. 18.

If the pilot should decide to reverse his ground track 180° then he would rotate pin 262 so that the arrow 261 on top of the pin 262 corresponds to the direction of his new heading. Rotating the pin 262 reverses the action of the microswitch 270 so that the "left-right" meter continues to indicate to the pilot which way he should turn the aircraft in order to maintain his selected ground course.

Should the pilot desire to remove the effect of correctional circuitry shown in FIG. 16 and allow the "left-right" meter 370 and "to-form" meter 375 to function normally then switch 300 is moved from contacts 301 to contacts 302, permanently energizing relay MF and removing from the circuit the circuit selecting brush 242.

Referring to FIGS. 19 through 22 there is illustrated a system for marking the position of an aircraft on a chart with respect to a ground station. The system not only visually points out on the chart the radial of a particular ground station on which the aircraft is located, but also the miles or distance from the aircraft to the ground station and the actual location of the aircraft on the chart. Enlarged views are shown to clarify the details.

A unit for placing on an aircraft navigation chart comprises a first transparent disc 430 having a second transparent disc 440 supported and rotatable above on a plurality of bearing means 450. A radial motor-reducer-potentiometer unit 400 similar to that described hereinbefore is secured on top of disc 440. A distance motor-reducer-potentiometer unit 410 is also secured to the top of disc 440.

Each bearing means 450 of the embodiment shown comprises a ball 451, retainer arms 452, 453 and attachment means 454 having flanges 455, 456. The ball bearing 451 rests in races 432, 441 which may be circumferential grooves formed in the top of disc 430 and the underside of disc 440. The flanges 455 and 456 may be bendable to be forced into the positions shown in FIG. 20. A screw or other securing means may be used to fasten the top flange 455 to disc 440. The bottom flange 456 is designed to fit loosely into the circumferential offset 435 formed around the bottom of disc 430. The flange 456 is designed to avoid engagement with the chart on which the apparatus is resting and to avoid engagement with the disc 430, until the unit is lifted, so that the upper disc 440 may rotate freely on the ball bearings 451. At least three of the bearing means 450 must be used to provide a three point support for disc 440. However, more bearings may be used. It should be noted that other suitable bearings other than that shown may be utilized to rotatably support disc 440 above disc 430.

The radial motor-reducer-potentiometer unit 400 is powered in the same manner illustrated in FIG. 3. However, the output shaft 401 is extended to drive gear 402. The support disc 440 is rotated by the engagement of gear 402 with a transparent gear 431 which may be formed integral with or secured to disc 430. If the proper gear ratios are chosen for gears 402, 431, no reducer unit will be required to obtain one revolution of the support disc 440 with respect to the compass rose disc 430 during the time the pointer of the potentiometer of radial unit 400 is making one revolution.

The radial on which the aircraft receiver is located is visually indicated by pointer means 420 which comprises an extendable tape 421 resting on transparent pointer support 425. The tape may have indicia 423 scribed thereon in a scale to note miles from the ground station. The tape or pointer 421 may be stored in housing 426 in the same manner a steel measuring tape is stored. The pointer may be steel tape with a transparent tip or may be transparent material.

Figure 19:
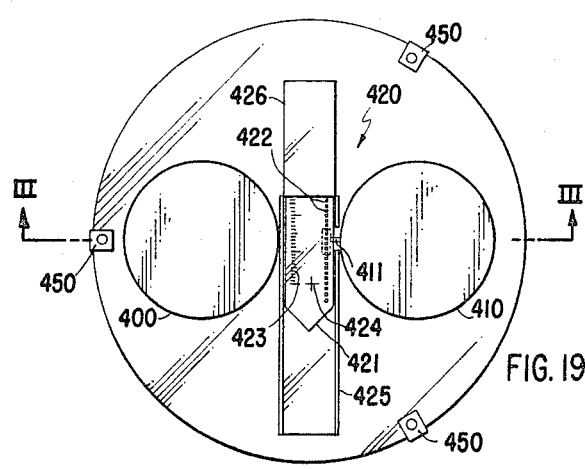
FIG. 19 is a plan view of an embodiment of this invention for marking the position and distance of a receiver on a specified radial.
Figure 21:
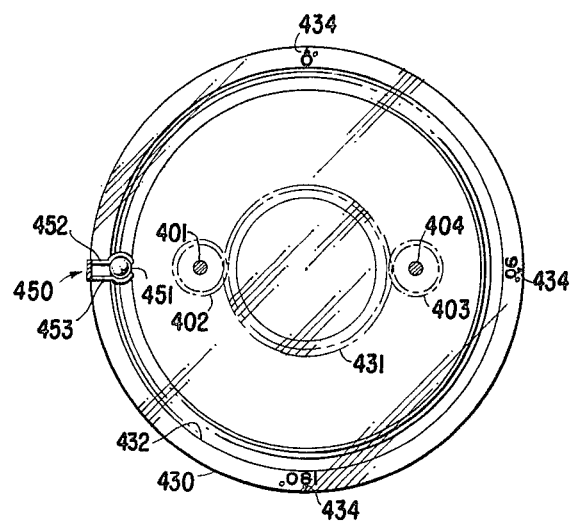
FIG. 21 is a cross sectional view taken at lines IV—IV of FIG. 20.
Figure 20:
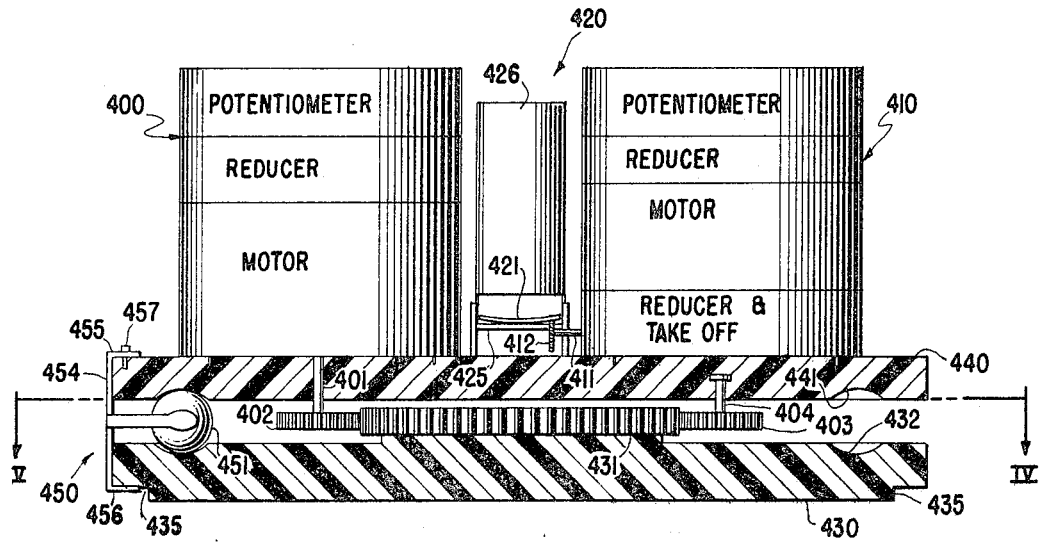
FIG. 20 is a cross sectional view taken at lines III—III of FIG. 19.

As described so far the apparatus shown in FIGS. 19 to 21 may be used in the same manner as the previously described motor-reducer-potentiometer units with the added advantage that the center of the alignment of the compass-rose disc, with degrees scribed at 434, is clearly visible to aid in placing disc 430 over the chart and reading the chart through the disc 430.

The distance motor-reducer-potentiometer unit 410 is utilized to drive tape or pointer means 420 out from the center of an aligned ground station on the aircraft navigation chart to indicate visually by cross-hairs 424 inscribed on tape 421 the exact location of the aircraft receiver on the chart.

Figure 22:
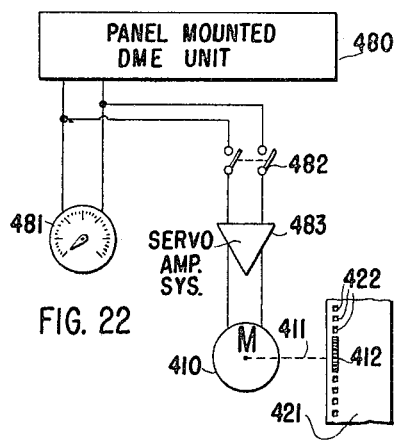
FIG. 22 is a block-schematic diagram of circuitry for operating the apparatus of FIGS. 19 to 21.

The distance unit 410 is connected through a take-off shaft 411 to a gear 412. The teeth of gear 412 are adapted to fit into notches or slots 422 formed in tape 421. Referring to FIG. 22 there is shown a schematic including a panel mounted distance measuring unit 480 and a miles readout indicator 481. The unit 480 may be the DME units commonly in use today or any other unit which supplies a signal which is translatable to distance units such as miles from a transmitting ground station. In the present invention the signal from the unit 480 is taken via "on-off" switch 482 through a servo amplifier system 483 which combines with the distance motor-reducer-potentiometer unit 410 to drive gear 412. The gear 412 will rotate to extend and retract tape or pointer 421 to the exact distance the aircraft receiver is located from the DME transmitting ground station. The servo amplifier 483—motor 410 system is available commercially.

The advantage of being able to view the actual location on the chart of a ground transmitting station through the transparent components now becomes readily apparent. The cross-hair 424 scribed on pointer 421 may be viewed either when the pointer is extended or when retracted to indicate an aircraft receiver location very close to or over the ground station.

The combination of the radial unit 400 and distance unit 410 obviously requires the use of only one assembly for continuous location of the aircraft receiver with all its attendant advantages.

Although satisfactory operation of the combination just described is easily attained it may be desirable to use an idler gear 403 rotating on dummy shaft 404 and engaged with fixed gear 431 and preferably diametrically located from drive gear 402. The use of idler gear 403 helps insure centering of disc 440 above disc 430 and thus reduces wear on bearing means 450 or the races 432, 441 formed in the discs.

Figure 24:
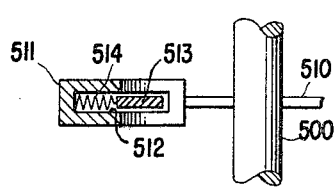
FIG. 24 is a cross-sectional view of the pointer means of FIG. 23 taken at lines V—V.
Figure 23:
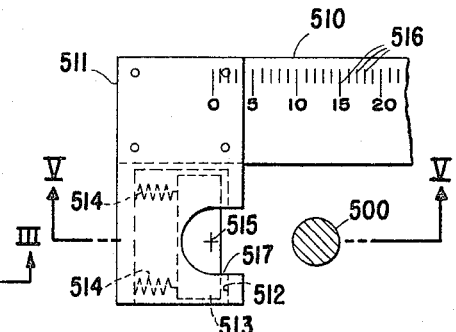
FIG. 23 is a plan view of an additional embodiment of pointer means for use in this invention.

Referring to FIGS. 23 and 24 there is illustrated a pointer means which may be installed off-center. Any of the tape storage or housing and/or tape drives shown hereinbefore may be utilized to store and drive pointer means 510. A transparent flange 511 is secured to the pointer 510 at a right or other angle to position crosshair 515 on the radial being identified. The cross-hair 515 is inscribed on a transparent member 513 slidably mounted in slot 512 formed in flange 511. Spring means 514 biases the cross-hair carrying member 513 to its required position. However, when pointer means 510 is retracted the flange 511 may have a notch 517 formed therein to receive a shaft 500, of one of the motor-reducer units described hereinbefore, so that pointer 510 may be fully retracted to the zero mile mark of the indicia 516 inscribed on pointer 510. The cross-hair carrying member 513 is then moved back into slot 512 against the bias of spring means 514.

It should be noted that while specific components have been described herein to perform various operations it is not intended to limit the scope of the invention thereby, since substitutions may be made without departing from the spirit and scope of the invention. Keeping this in mind, then, there has been described a system for providing a continuous visual indication on a map or chart of the position of a craft which comprises means for producing a radial signal indicating the radial of a navigation station on which the craft is located, position indicating means adapted to be aligned on a map on a navigation station including radial pointer means, circuit means for deriving a signal from the position of the radial pointer means, circuit means for comparing the derived signal to the radial signal and pointer rotating means responsive to a difference between the derived and radial signals.

The radial signal producing means may comprise a phase measuring circuit. The deriving circuit means may comprise an adjustable potentiometer having its pointer or slider linked to the radial pointer means. The comparing circuit means may comprise a phase sensitive amplifier adapted to produce an output to the pointer driving means in response to an input of the radial and derived signals of different phases. The pointer driving means may comprise a motor-reducer-potentiometer unit linked to the radial pointer means and the slider of the potentiometer.

The system may include a second assembly as just described which may be a second radial pointer means adapted to indicate the position of a craft where the first and second radial pointer means intersect.

The system may include a second assembly similar to that just described with the exception that a pointer driving means is not utilized. Instead the first-mentioned radial pointer means and a second radial pointer means may be joined at their intersection so that the first-mentioned pointer means drives the second pointer means. A coincidence means is then utilized to detect and indicate if the second radial pointer means is in a predetermined position.

The system may further include means for producing a signal indicating the distance of the craft from the navigation station and means responsive to the distance signal for extending and retracting the radial pointer means.

Having described the invention, I claim:

1. A system for providing a continuous visual indication on a map of the position of a craft comprising means for producing a radial signal indicating the radial of a navigation station on which the craft is located; position indicating means adapted to be aligned on a map on a navigation station including radial pointer means; circuit means for deriving a signal from the position of said radial pointer means; circuit means for comparing said derived signal to said radial signal; and radial pointer rotating means responsive to a difference between said derived and radial signals.

2. A system as defined in claim 1 in which said radial signal producing means comprises a phase measuring circuit and said deriving circuit means comprises an adjustable potentiometer having a slider linked to said radial pointer means.

3. A system as defined in claim 1 in which said comparing circuit means comprises a phase sensitive amplifier adapted to produce an output to said pointer rotating means in response to an input of said radial signal and said derived signal of different phases.

4. A system as defined in claim 1 in which said radial signal producing means comprises a phase measuring circuit and said deriving circuit means comprises an adjustable potentiometer having a slider linked to said radial pointer means, and in which said comparing circuit means comprises a phase sensitive amplifier adapted to produce an output to said pointer rotating means in response to an input of said radial signal and said derived signal of different phases.

5. A system as defined in claim 4 in which said pointer rotating means comprises a motor-reducer unit linked to said radial pointer and said adjustable slider of said potentiometer.

6. A system as defined in claim 1 having a second means for producing a radial signal indicating the radial of a second navigation station on which the craft is located; second position indicating means adapted to be aligned on said map on said second navigation station including second radial pointer means; second circuit means for deriving a second signal from the position of said second radial pointer means; second circuit means for comparing said second derived signal to said second radial signal; and second pointer rotating means responsive to a difference between said second derived and said second radial signals, the intersection of said first and second radial pointer means denoting the position of said craft on said map.

7. A system as defined in claim 1 having a second means for producing a radial signal indicating the radial of a second navigation station on which the craft is located; second position indicating means adapted to be aligned on said map on said second navigation station including second radial pointer means; second circuit means for deriving a second signal from the position of said second radial pointer means; means connecting the intersection of said first and second radial pointer means; circuit means for comparing said second radial signal and said second derived signal; and means for measuring a coincidence in position of said second radial pointer means with the indicated radial of said second navigation station.

8. A system as defined in claim 7 in which said means connecting the intersection of said first and second radial pointer means includes means for marking the intersection on said map.

9. A system as defined in claim 7 in which said means connecting the intersection of said first and second radial pointer means includes a slide block means and a guide track means to receive said slide block means, said track means being adapted to be aligned along an intended course on said map.

10. A system as defined in claim 7 in which said coincidence measuring means includes meter means operative to indicate a position of said craft to the left or right of the indicated radial of said second navigation station.

11. A system as defined in claim 10 in which said means connecting the intersection of said first and second radial pointer means includes pin means; slide block means adapted to receive said pin; guide track means adapted to receive said slide means and to be aligned along an intended course on said map; and switching means, actuated by predetermined positions of said pin and operative to selectively reverse input signals to said meter means.

12. A system as defined in claim 11 in which said pin means has indicia thereon which may be set to note the heading of travel of said craft, and in which said slide block means includes means adapted to removably secure said pin means in a desired position.

13. A system as defined in claim 1 including means for producing a signal indicating the distance of said craft from said navigation station; and means responsive to said distance signal for extending and retracting said radial pointer means to denote the position of said craft on a selected radial.

14. A system as defined in claim 13 in which said extending and retracting means includes gear means meshed with slots formed in said radial pointer means.

15. A system as defined in claim 1 in which said radial pointer means comprises a self-supporting tape having a transparent pointer end, housing means, and means for retracting and extending said tape.

16. A system as defined in claim 1 in which said radial pointer means comprises a pointer having a slot formed therein to receive guide supports.

17. A system as defined in claim 1 in which means for supporting said position indicating means over said map comprises a transparent plate having degrees of a compass rose scribed thereon and means for removably securing said support means in a desired position over said map.

18. A system as defined in claim 1 in which said radial pointer rotating means comprised a motor-reducer unit having an output shaft, support means for said motor-reducer unit including means for removably securing said output shaft of said motor-reducer unit in a desired position over said map.

19. A system as defined in claim 18 in which said radial pointer means is carried by said motor reducer unit.

20. A system as defined in claim 19 in which said radial pointer means has a slot formed therein to receive said output shaft.

21. A system as defined in claim 19 in which said radial pointer means is offset from said output shaft and has an offset pointer end to position a marking element on a radial centered through said output shaft.

22. A system as defined in claim 21 having means for extending and retracting said radial pointer means, said offset pointer end having a groove formed therein to receive said output shaft, and means for yieldingly biasing said marking element into said shaft-receiving groove.

23. A system as defined in claim 1 wherein said radial pointer means has indicia thereon to indicate distances in scale.

24. A system for providing a continuous visual indication on a map of the position of a craft comprising means located in said craft for receiving a signal from a navigation station; means responsive to said station signal for producing a radial signal indicating the radial of said navigation station on which the receiver is located; position indicating means adapted to be aligned on a map on said navigation station including radial pointer means, pointer rotating means, and means adapted to actuate said pointer rotating means; said actuating means including circuit means for deriving a signal from the directional position of said pointer means and circuit means for comparing said derived signal and said radial signal.

25. A system as defined in claim 24 in which said deriving circuit means comprises potentiometer means having a movable slider means linked to said radial pointer means.

26. A system as defined in claim 25 in which said pointer rotating means comprises a motor means responsive to a phase difference between said radial and derived signals.

27. A system for providing a continuous visual indication on a map of the position of a craft comprising means located in said craft for receiving a signal from a navigation station; means responsive to said station signal for producing a radial signal indicating the radial of said navigation station on which the receiver is located; position indicating means adapted to be aligned on a map on said navigation station including radial pointer means, pointer rotating means, and means adapted to actuate said pointer rotating means; said actuating means including circuit means for deriving a signal from the directional position of said pointer means and circuit means for comparing said derived signal and said radial signal, and in which said deriving circuit means comprises potentiometer means having a movable slider means linked to said radial pointer means.

References Cited by the Examiner
UNITED STATES PATENTS

| | | | |
|---|---|---|---|
| 2,595,315 | 5/1952 | Weihe | 343—112 X |
| 2,717,735 | 9/1955 | Luck | 343—112 X |
| 3,009,147 | 11/1961 | Fernandez | 343—112 |

CHESTER L. JUSTUS, *Primary Examiner.*

LEWIS H. MYERS, *Examiner.*

R. E. BERGER, *Assistant Examiner.*